July 31, 1962 J. W. SKERRITT 3,047,732

FLIP-FLOP RESPONSIVE TO LEADING AND TRAILING TRANSIENTS OF SUCCESSIVE INPUT PULSES EMPLOYING DIODE, R-C COMBINATION

Filed Jan. 3, 1961

INVENTOR
JOHN W. SKERRITT

BY Frederick D. Poag
ATTORNEY

United States Patent Office 3,047,732

Patented July 31, 1962

3,047,732

FLIP-FLOP RESPONSIVE TO LEADING AND TRAILING TRANSIENTS OF SUCCESSIVE INPUT PULSES EMPLOYING DIODE, R-C COMBINATION

John W. Skerritt, Kingston, N.Y., assignor to International Business Machines Corporation, New York, N.Y., a corporation of New York Filed Jan. 3, 1961, Ser. No. 80,115
9 Claims. (Cl. 307—88.5)

This invention relates to switching circuits and more particularly to a bistable multivibrator embodying a simplified single steering circuit operable to complement the state of the multivibrator.

It is usual in bistable multivibrators to provide separate steering circuits connected to the inputs of the two inverters, even where only a complement input is desired such as in some counter employments. The present invention provides a bistable multivibrator, or flip-flop, wherein a single steering circuit serves as a complement input, thereby saving in components and thus reducing the exposure to component failure.

In accordance with the invention, this dual purpose single steering circuit is enabled by employing a diode input in a network comprising a capacitor which is clamped variably by one of the inverters of the flip-flop so that it delivers input pulses of successively opposite sign to the other inverter upon the application of successive input pulses, of a single sign, to the network. Accordingly, oppositely going useful transients are coupled through the diode. Furthermore, advantage is taken of the recovery time of the diode to propagate one of these transients in the back biased direction through the diode.

Although the circuit requires input pulses for its operation, it may be adapted to operation from swings in D.C. level input by provision of a differentiating network in its input. Accordingly, circuits of the invention may be connected in cascade, and since, in the preferred forms, the circuit responds to input pulses or levels of only one polarity, such a series of the preferred circuits constitutes a count down arrangement for use, for example, as a frequency divider.

Accordingly, it is an object of the invention to provide an improved bistable multivibrator.

It is another object of the invention to provide a multivibrator as aforesaid having a single complement input circuit.

It is still another object of the invention to provide an improved multivibrator circuit as aforesaid employing a single steering diode.

It is yet another object of the invention to provide an improved multivibrator adapted to be driven in cascade so as to provide a frequency dividing count down circuit.

The foregoing and other objects, features and advantages of the invention will be apparent from the following more particular description of preferred embodiments of the invention, as illustrated in the accompanying drawings.

Figure 1:
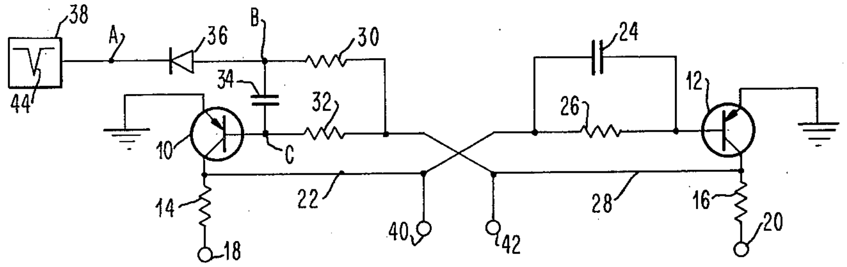
FIG. 1 is a diagram of an improved multivibrator in accordance with the invention.

Referring now more particularly to FIG. 1, the illustrated circuit arrangement comprises inverter transistors 10, 12 each having a load resistor 14, 16 and a voltage supply terminal 18, 20. The collector of one inverter 10 is coupled to the base of the other inverter 12 by a conductor 22, a coupling capacitor 24 and a resistor 26. The collector of the other transistor 12 is coupled by a conductor 28 and a network comprising resistors 30 and 32 and a capacitor 34 to the base of the first inverter transistor 10. The operation of the coupling network 30, 32, 34 from the steering aspect will be described more fully hereinafter, but it will be seen that in so far as steady state conditions are concerned, in either of the two stable states of the multivibrator, the two inverters are cross coupled generally in a manner which is characteristic of multivibrators.

The aforesaid resistor 30 and capacitor 34 may be viewed as primarily part of the steering network, which is completed by a steering diode 36 which may receive operating pulses from any suitable source indicated diagrammatically at 38. The circuit is provided with one or more output terminals 40, 42 which may be connected in the cross coupling network as shown.

Figure 2:
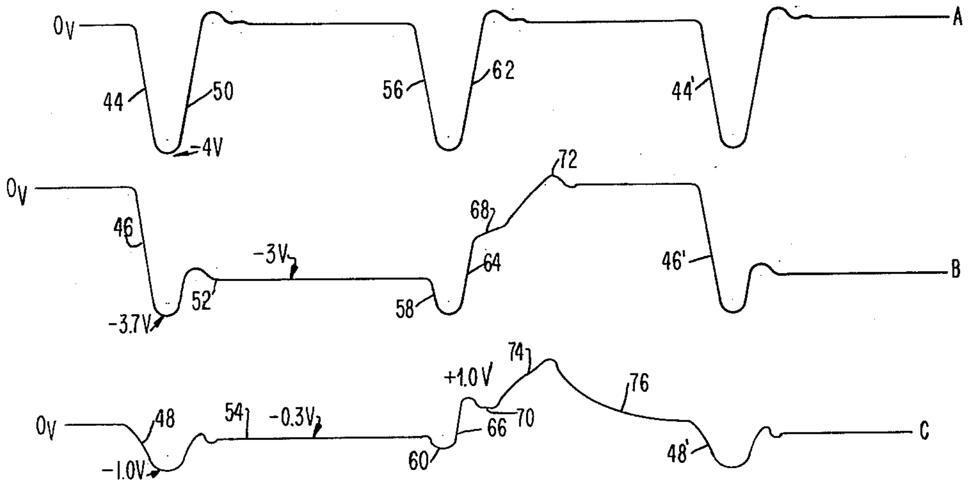
FIG. 2 is a series of voltage graphs indicating operating transients within the circuit of FIG. 1.

Referring to FIG. 2, time oriented voltage curves representative of the potential levels at points A, B and C of FIG. 1 are shown for illustration of the operation of that circuit. Assuming that the multivibrator of FIG. 1 is in a state wherein the inverter transistor 10 is in its off condition, when a negative input pulse 44 is supplied by the source 38 to point A, this input pulse 44 is coupled through diode 36 to point B which therefore falls as shown at 46. This transient is coupled through the steering capacitor 34 to the base of transistor 10 as indicated at 48, driving that base negative so as to turn transistor 10 on and, through the cross coupling path 22, 24, to turn the other inverter transistor 12 off. When the second transistor 12 turns off its collector falls toward the value of its supply 20, and this potential is coupled by the conductor 28 and the resistor 30 to point B so as to prevent point B from rising with the trailing transient 50 of the input pulse. Point B is thus clamped at a considerably negative voltage as indicated at 52 and point C becomes stable at a lesser negative voltage indicated at 54 dictated by the operating characteristics of the turned-on transistor 10 to the base of which it is connected. The multivibrator is thus retained in a stable state with one output terminal 40 connected to the collector of the first transistor, near ground and the other output terminal 42 at a potential near the value of the power supply terminal 20.

The next input pulse 56 applied from the source 38 to point A is not coupled through the diode 36 until it has reached a sufficiently negative value to forward bias the diode, so that only a portion of the leading or falling edge of this pulse is coupled to point B, as indicated at 58. This is coupled through the steering capacitor 34 to point C as indicated at 60 but does not drive point C very much more negative because of the clamping action of the emitter base junction of transistor 10. Thus additionally charged capacitor 34 serves to couple the trailing or rising portion 62 of the input pulse, as applied through the diode to point B and indicated at 64 to the base of transistor 10 as indicated at 66. It will be observed that this transient drives the base of transistor 10 positive thereby sharply turning this transistor off. The turning off of transistor 10 is coupled through conductor 22 and coupling capacitor 24 to turn the other inverter transistor 12 on, but before transistor 12 can turn on there is a leveling off of the rise of point B as indicated at 68 which permits point C to begin to fall as indicated at 70. Before this fall in point C can progress far enough to tend to turn transistor 10 on again, transistor 12 has turned on and through conductor 28 and resistor 30 forces point B up toward ground as indicated at 72. Capacitor 34 forces point C to follow point B as indicated at 74 until capacitor 34 can bleed its charge through resistors 30 and 32 as indicated by the decay 76. The circuit is thus switched to its other stable state wherein output 40 falls to near the value of power supply 18 and the other output terminal 42 rises to near ground. The circuit is now ready and a new cycle of operations the initiation of which is indicated at 44′, 46′, 48′.

Figure 3:
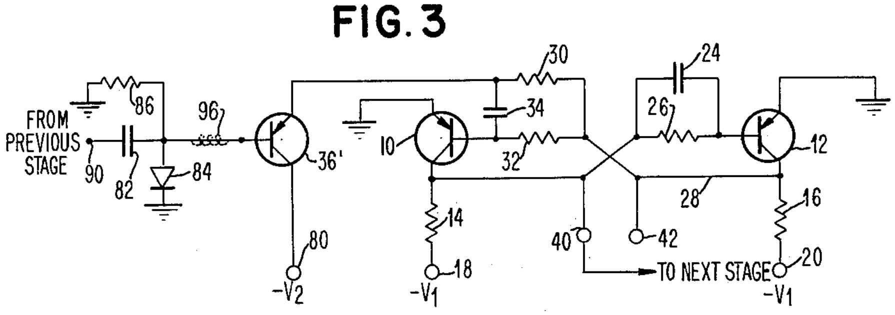
FIG. 3 is a diagram of a multivibrator similar to that of FIG. 1, embodying the invention in another form and having a differentiating input for operation in cascade.

Referring to FIG. 3 a modified embodiment of the invention is shown which utilizes the emitter base diode of an emitter follower transistor 36′ as the steering diode of the circuit. A collector supply is provided for the emitter follower at 80. In this embodiment the configuration and operation of the multivibrator are, apart from its input circuit portions, identical to those characteristics of the multivibrator circuit of FIG. 1 as indicated by the like numbering of parts between the two figures. Moreover, the emitter follower 36′ operates in the same manner as the steering diode 36 of FIG. 1 and these two parts are interchangeable with each other in the circuits of FIGS. 1 and 3, the emitter follower having some advantage in some applications since it presents, other factors being equal, a higher input impedance.

Figure 4:
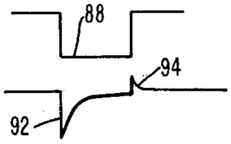
FIG. 4 is a voltage graph showing the operation of the differentiating input of FIG. 3.

As illustrated, the circuit of FIG. 3 is adapted to being driven by a level shift rather than an input pulse. Accordingly, a differentiating circuit is provided which comprises a capacitor 82, clamped to ground by a diode 84, and bled to ground by a resistor 86. Referring to FIG. 4, as a negative level 88 is applied to the input terminal 90 of the differentiating network, the leading or falling edge of the input signal 88 will be propagated to the base of the emitter follower 36′ as a negative pulse 92, while the trailing or rising edge of the level 88 will result in only a small spike 94 due to the clamping action of the diode 84. As will be described more fully hereinafter, it is essential for proper operation of the circuit that the input pulses applied to the steering diode 36 or 36′ of the illustrated circuits be larger in value than the shift of the collector of the steering capacitor reference level determining transistor. Accordingly, where, as shown and described herein, the multivibrator circuits utilized in a chain are symmetrical and their inverter power supplies are of the same value, it is convenient to provide a step up of the output of one multivibrator so that it can readily operate the input of the next. Such a step up may be provided for example by an inductance 96 to provide a ringing which increases the amplitude of the useful input spike 92. This inductance need not be large, and for circuits providing an abrupt pertinent edge in the operating level shift 88, distributed inductance will often suffice, as indicated.

Figure 5:
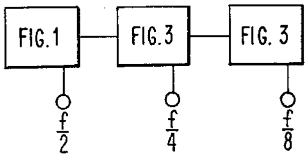
FIG. 5 is a block diagram showing connection of the circuits of FIGS. 1 and 3 in cascade relation to form a frequency dividing count down device.

FIG. 5 illustrates the connection of multivibrator circuits in accordance with the invention in a chain to provide a frequency dividing count down arrangement. Accordingly, if the repetition rate of the input pulse 44 of the circuit of FIG. 1 is at some frequency "$f$," then the output 40 or 42 of the FIG. 1 circuit will be a square wave at a rate of $f/2$ and if either of these outputs is connected to the input terminal 90 of a next stage in accordance with FIG. 3, the output of that next stage such as at terminal 40 thereof will be at a frequency of $f/4$, and this stage may be utilized to drive succeeding stages of the same kind, thus yielding outputs of $f/8$ and so on.

If desired, the voltage supplies 18, 20 of the several multivibrator circuits can be arranged to have successively decreasing amplitudes in addition to or in lieu of the ringing described with respect to the circuit of FIG. 3, so as to provide, successively, the desired reduction of steering circuit reference swing with relation to the corresponding input signal. Alternatively, asymmetrical multivibrator circuits could be used, one side providing the steering reference and the other side providing a larger output for operation of a like succeeding stage.

Typical components for the circuits of FIGS. 1 and 3 may be as follows:

| | | |
|---|---|---|
| Transistors 10, 12, 36′ | | CK760 |
| Resistors 14, 16 | ohms | 390 |
| Inverter power supplies 18, 20 | volts [1] | −6 |
| Capacitor 24 | micro-microfarads | 330 |
| Resistors 26, 32 | ohms | 18,000 |
| Resistor 30 | do | 330 |
| Capacitor 34 | micro-microfarads | 470 |
| Diode 36 | | 1N571 |
| Signal 44 from source 38 | volts [1] | −7 |
| Emitter follower supply 80 | do | −10 |
| Capacitor 82 | micro-microfarads | 820 |
| Diode 84 | | T6G |
| Resistor 86 | ohms | 68 |
| Inductance 96 | microhenrys | 100 |

[1] These voltages may be varied but are interrelated as indicated hereinafter.

Although the voltage supplies 18 and 20 are listed above as −6 volts, this value is quite arbitrary except as it relates to the input pulse 44, as above described, and to the emitter follower supply 80. Accordingly, the supplies 18 and 20 could be another value which is smaller than the input pulse by enough to condition the steering diode 36 or transistor 36′ as aforedescribed. Accordingly, a smaller assumed voltage, −3 volts, for the supplies 18, 20 has been taken as the basis for the particular curves shown in FIG. 2 so that a scale could be used which brings out the various potential changes and differences in the circuit, including the small diode insertion loss and emitter to base voltage differences. Of course, the emitter follower supply 80 should be of greater amplitude than the input signal applied thereto.

It should be noted that when the second input pulse 56 (FIG. 2) is applied to the circuit it is the trailing portion 62 thereof which is effective to turn transistor 10 off. This is enabled by the fact that the input pulse has conditioned the diode, that is, has turned it on, so that portion 64 of the curve for point B is made to follow the rise 62 in the trailing side of the input pulse by means of continued operation of the steering diode even though the potential at point B during this rise is actually negative relative to the potential at point A. Accordingly, conduction through the diode in the back biased direction is utilized, this conduction being enabled by the fact that the diode has not had time to recover to a high impedance in this direction. This operation cooperates with the variable reference potential supplied by the collector of the second transistor 12 to enable operation of the single diode, single capacitor steering means of the invention.

What is claimed is:

1. A multivibrator circuit comprising a pair of cross coupled switching devices, one of said devices comprising means adapted to supply a reference potential having first and second values corresponding to different conductive states of said one device, steering means connected to the input of the other said switching device and comprising an asymmetrically conductive device and an alternating current coupling-direct current isolating device, means communicating said reference potential to said steering means, signal source means connected to said steering means and adapted to provide signal pulses of the same polarity as said reference potential and of larger amplitude than the same, said steering means being operable to change the conductive state of said other switching device by and upon each excursion of said signal pulses beyond the amplitude value of said reference potential, said steering means being sensitive to the leading transient and the trailing transient, alternately, of successive ones of said signal pulses.

2. A multivibrator circuit in accordance with claim 1, wherein said alternating current coupling-direct current isolating device is a capacitor connected between said asymmetrically conducting device and said input.

3. A multivibrator circuit in accordance with claim 1, wherein said asymmetrically conducting device is a diode.

4. A multivibrator circuit in accordance with claim 1, wherein said asymmetrically conducting device is an emitter follower.

5. A multivibrator circuit in accordance with claim 1, wherein said signal source means comprises means including differentiating means adapted to generate said signal pulses.

6. A multivibrator circuit in accordance with claim 1, wherein said signal source means comprises a square wave source and differentiating means adapted to generate said signal pulses from transients of a single sign in the square wave of said square wave source.

7. In combination, a switching circuit comprising a switching device having an input and an output, a source of pulses, an asymmetrically conductive device connected to said source and poled to be forward biased by said pulses, a capacitor connected between said conductive device and said input, and means responsive to said output and providing a potential having first and second values complementary to the level of said output, said potential values being of the same sign and smaller amplitude than said pulses, said last means being connected to said capacitor at the side thereof remote from said input.

8. The combination in accordance with claim 7, wherein said switching device comprises a transistor and said asymmetrically conducting device is a diode.

9. The combination in accordance with claim 7, wherein said switching device comprises a transistor and said asymmetrically conducting device is an emitter follower.

References Cited in the file of this patent

UNITED STATES PATENTS

| | | |
|---|---|---|
| 2,881,333 | Pickard | Apr. 7, 1959 |
| 2,888,580 | Wanlass | May 26, 1959 |
| 2,987,632 | Milford | June 6, 1961 |